(12) United States Patent
Logan, Jr. et al.

(10) Patent No.: US 8,773,665 B1
(45) Date of Patent: Jul. 8, 2014

(54) COMPACT FIBER OPTIC GYROSCOPE

(75) Inventors: Ronald T. Logan, Jr., Pasadena, CA (US); Ka Kha Wong, Alhambra, CA (US)

(73) Assignee: Emcore Corporation, Albuquerque, NM (US)

( * ) Notice: Subject to any disclaimer, the term of this patent is extended or adjusted under 35 U.S.C. 154(b) by 356 days.

(21) Appl. No.: 13/078,428

(22) Filed: Apr. 1, 2011

(51) Int. Cl.
*G01C 19/72* (2006.01)

(52) U.S. Cl.
USPC ........................................................ 356/460

(58) Field of Classification Search
CPC .... G01C 19/72; G01C 19/722; G01C 19/723; G01C 19/725; G01C 19/726; G01C 19/727; G01C 19/728
USPC .................... 356/460, 461; 73/504.01, 504.02
See application file for complete search history.

(56) References Cited

U.S. PATENT DOCUMENTS

| | | | |
|---|---|---|---|
| 4,373,814 A * | 2/1983 | Lacombat et al. | 356/460 |
| 4,615,582 A * | 10/1986 | Lefevre et al. | 385/4 |
| 5,444,534 A * | 8/1995 | Dyott et al. | 356/465 |
| 5,677,767 A | 10/1997 | Shirasaki et al. | |
| 5,686,990 A * | 11/1997 | Laznicka, Jr. | 356/460 |
| 5,719,674 A | 2/1998 | Martin et al. | |
| 5,818,589 A | 10/1998 | Scholz et al. | |
| 6,034,924 A | 3/2000 | Vakoc | |
| 6,201,923 B1 * | 3/2001 | Yuhara et al. | 385/137 |
| 6,278,657 B1 | 8/2001 | Vakoc | |
| 6,351,310 B1 | 2/2002 | Emge et al. | |
| 6,377,391 B1 | 4/2002 | Vakoc et al. | |
| 6,466,364 B1 | 10/2002 | Vakoc et al. | |
| 6,529,444 B2 | 3/2003 | Vakoc | |
| 6,667,935 B2 | 12/2003 | Vakoc | |
| 6,678,211 B2 | 1/2004 | Vakoc | |
| 7,417,740 B2 | 8/2008 | Alphonse et al. | |
| 7,746,476 B2 | 6/2010 | Demers et al. | |
| 2002/0097636 A1 | 7/2002 | Vakoc | |
| 2002/0145795 A1 | 10/2002 | Vakoc et al. | |
| 2002/0191937 A1 | 12/2002 | Knox et al. | |
| 2003/0043696 A1 | 3/2003 | Vakoc | |
| 2003/0043697 A1 | 3/2003 | Vakoc | |
| 2003/0123064 A1 | 7/2003 | Szafraniec et al. | |

(Continued)

OTHER PUBLICATIONS

U.S. Appl. No. 13/158,865, Jun. 13, 2011, Logan et al.

*Primary Examiner* — Michael A Lyons
*Assistant Examiner* — Shawn Decenzo (57) ABSTRACT

A compact fiber optic gyroscope including a first housing; a transceiver module disposed in the first housing, the transceiver module including a second housing; a non-coherent light source disposed in the second housing for producing a first beam of light; a single lens for focusing the first beam of light; an optical circulator disposed in the second housing and in the path of the first beam of light to produce polarized second and third beams respectively, with polarization orthogonal to each other; and first and second photodiodes disposed in the second housing and coupled to the optical circulator, wherein the first photodiode is a transmit monitor photodiode coupled to the second beam, and the second photodiode is a receiver photodiode. The first housing further includes a planar optical fiber loop having a first end and a second end; a phase modulator coupled to the third beam emitted from the transceiver module to produce fourth and fifth beams coupled to the first and the second end respectively of the optical fiber loop respectively, and for receiving the return sixth and seventh beams from the second and the first ends respectively of the optical fiber loop.

19 Claims, 4 Drawing Sheets

(56) References Cited

U.S. PATENT DOCUMENTS

| | | |
|---|---|---|
| 2006/0139727 A1* | 6/2006 | Gafsi et al. .................. 359/280 |
| 2007/0030491 A1 | 2/2007 | Ohno et al. |
| 2007/0097374 A1 | 5/2007 | Ren-Young |
| 2009/0015843 A1 | 1/2009 | Demers et al. |
| 2010/0220332 A1 | 9/2010 | Digonnet |
| 2010/0301352 A1 | 12/2010 | Strandjord et al. |
| 2011/0037972 A1 | 2/2011 | Bergh |
| 2013/0033737 A1 | 2/2013 | Logan et al. |

* cited by examiner

COMPACT FIBER OPTIC GYROSCOPE

BACKGROUND OF THE INVENTION

1. Field of the Invention

The invention relates to fiber optic gyroscopes (FOGs) and in particular to integration techniques that implement a single-axis FOG transceiver subassembly having high accuracy and low noise in a small, compact cylindrical form factor.

2. Description of the Related Art

A FOG is a device that uses the propagation of light beams in an optical fiber coil to detect mechanical rotation of the fiber coil. The sensor is a coil of as much as 5 km or more of optical fiber. The typical implementation provides that two light beams be launched into the fiber in opposite directions. Due to an optical phenomenon known as the Sagnac effect, the beam traveling against the rotation experiences a slightly shorter path than the other beam resulting in a relative phase shift. The amount of the phase shift of the original two beams can be measured by determining how the beams interfere with each other when they are combined. The intensity of the combined beam then depends on the rotation rate of the fiber coil about its axis.

A FOG provides extremely precise rotational rate information, in view of its lack of cross-axis sensitivity to vibration, acceleration, and shock. Unlike the classic spinning-mass gyroscope, the FOG has virtually no moving parts and no inertial resistance to movement. The FOG also can provide higher resolution than a ring laser gyroscope and is utilized in inertial navigation systems requiring a very high degree of accuracy.

There are two types of FOG systems, closed loop and open loop. In a closed loop system, a feedback path is defined so as to maintain the phase difference between the light beams constant after the beams exit the ends of the fiber coil. The amount of feedback phase needed to maintain the fixed phase relation is therefore indicative of the rate of rotation of the coil about its axis.

Open loop FOG systems calculate the rotation rate by way of amplitude measurements taken along an interference curve that results when the two exiting light beams are recombined.

SUMMARY OF THE INVENTION

1. Objects of the Invention.

It is an object of the present invention to provide a fiber optic gyroscope in a small, highly integrated form factor.

It is another object of the present invention to provide a single-axis fiber optic gyroscope in a single integrated housing.

It is also another object of the present invention to provide a fiber optic gyroscope having high accuracy and low noise using an integrated opto-electronic transceiver subassembly.

It is also another object of the present invention to provide a fiber optic gyroscope having a rotational rate drift of less than 1 degree per hour.

It is also another object of the present invention to provide a fiber optic gyroscope having noise measured in angular degrees random walk per square root of hour of less than 0.02 degrees.

It is also another object of the present invention to provide a fiber optic gyroscope capable of recording angular rate changes of greater than 500 degrees per second.

It is also another object of the present invention to provide a fiber optic gyroscope having a closed loop feedback path so as to maintain the phase difference between the light beams constant after the beams exit the ends of the fiber coil.

It is still another object of the present invention to provide a fiber optic gyroscope that may be manufactured to a specified degree of accuracy by changing the fiber coil length and by programming an internal processor.

It is still another object of the present invention to provide a fiber optic gyroscope that is operable over a wide performance range that may be adapted by the user to a specified degree of accuracy or noise tolerance by changing certain parameters, such as fiber coil length, of the unit.

Some implementations may achieve fewer than all of the foregoing objects.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

2. Features of the Invention

Briefly, and in general terms, the present disclosure provides a compact fiber optic gyroscope including a first housing; a transceiver module disposed in the first housing, and including a second housing; a non-coherent light source disposed in the second housing for producing a first beam of light; an optical circulator disposed in the second housing and in the path of the first beam of light to produce polarized second and third beams respectively, with polarization orthogonal to each other; and first and second photodiodes disposed in the second housing and coupled to the optical circulator, wherein the first photodiode is a transmit monitor photodiode coupled to the second beam, and the second photodiode is a receiver photodiode; a planar optical fiber loop disposed in the first housing and having a first end and a second end; a phase modulator disposed in the first housing and coupled to the third beam from the transceiver module to produce fourth and fifth beams coupled to the first and the second end respectively of the optical fiber loop respectively, and receiving the return sixth and seventh beams from the second and the first ends respectively of the fiber loop, and coupling the return sixth and seventh beams to the receiver photodiode in the transceiver module; and a processor disposed in the first housing and coupled to the receiver photodiode for determining the phase relationship between the two counter propagating beams in the fiber loop and thereby determining the rotational rate of the planar optical fiber loop with respect to an axis.

The optical circulator can include a polarizing beam splitter.

The optical circulator can further include a Faraday rotator coupled to an output of the polarizing beam splitter.

The phase modulator may be a lithium niobate modulator.

The phase modulator may have an output pair of optical fibers which may be spliced to the first end and the second end respectively of the planar optical fiber loop.

The planar optical fiber loop can be circumferentially disposed around the interior periphery of the first housing.

The first housing may be cylindrically shaped and the planar optical fiber loop may be circumferentially disposed around the interior periphery of the first housing.

The first housing may be cylindrically shaped having dimensions of approximately 80 mm in diameter, and 20 mm in height.

The weight of the gyroscope may be 160 grams or less.

The second housing may be a hermetically sealed butterfly package.

The rotational rate of the gyroscope may have a drift of between 0.005 and 1.0 degrees per hour.

The rotational rate of the gyroscope may have a drift that is adjustable by the user to a desired operational range.

The rotational rate of the gyroscope may have a drift that is operable over an operational range of up to 1.0 degree per hour.

The noise measured in angular degrees random walk per square root of hour of the gyroscope may be less than 0.02 degrees.

The noise tolerance of the gyroscope may be selected by the user to a desired angular degrees random walk per square root of hour.

The length of the fiber optic loop may be greater than 180 meters.

The length of the fiber optical loop of the gyroscope may be selected by the user to a desired length.

In another aspect of the invention, the present disclosure provides a transceiver subassembly for a fiber optic gyroscope including a housing; a non-coherent light source disposed in the housing for producing a first beam of light; a single focusing lens disposed in the housing directly adjacent to the light source; a polarizing beam splitter disposed in the housing and disposed in the path of the first beam of light for producing a second and a third beam respectively, with polarization orthogonal to each other; a monitor photodiode disposed in the housing and disposed in the path of the second beam to monitor the intensity of the second beam; a Faraday rotator disposed in the housing and disposed in the path of the third beam; a single input/output optical fiber directly adjacent to and optically coupled to the Faraday rotator; and a receiver photodiode disposed in the housing and coupled to the Faraday rotator for receiving an input optical signal from the input/output optical fiber.

The polarizing beam splitter can direct the S polarization of the initial beam of light from the incoherent source through and into the Faraday rotator.

The polarizing beam splitter can direct the P polarization of the initial beam of light from the incoherent source onto a power monitoring photodiode.

The polarizing beam splitter may direct the return light of the P polarization to the receiver photodiode.

The optical circulator can include a Faraday rotator, and the polarizing beam splitter can couple the light of S polarization to the Faraday rotator.

A monitor photodiode can be coupled to the polarizing beam splitter for monitoring the light of P polarization from the light source.

The transceiver module may include a single input/output optical fiber coupled to the optical circulator.

The single input/output optical fiber may terminate in a pig tail.

The single input/output optical fiber may be coupled to a lithium niobate modulator having an input optical fiber which may be spliced to the end of the pig tail input/output optical fiber extending from the transceiver.

The transceiver module may include a single lens disposed adjacent to the non-coherent light source for coupling the first beam from the light source through the optical circulator to focus on the input/output optical fiber.

The Faraday rotator may change the polarization of the S polarized return sixth and seventh beams to a P polarized eighth beam, and the polarizing beam splitter may then direct the P polarized eighth beam to the receiver photodiode.

Some implementations of the present invention may incorporate or implement fewer of the aspects and features noted in the foregoing summaries.

BRIEF DESCRIPTION OF THE DRAWINGS

These and other features and advantages of this invention will be better understood and more fully appreciated by reference to the following detailed description when considered in conjunction with the accompanying drawings wherein.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

Figure 1:
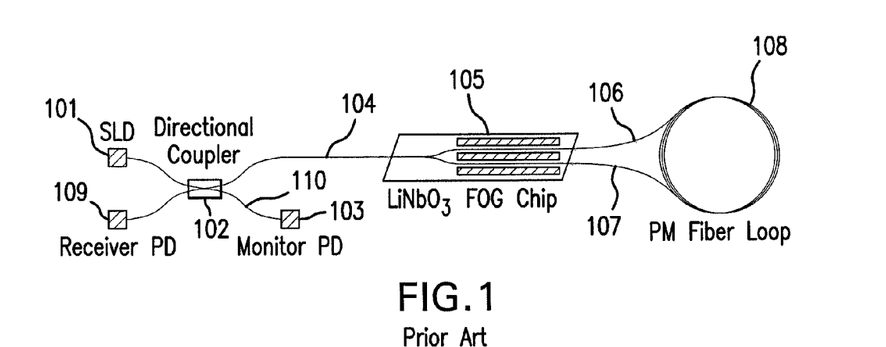
FIG. 1 is a highly simplified block diagram of a prior art single-axis fiber optic gyroscope.

FIG. 1 depicts a highly simplified diagram of a single-axis fiber optic gyroscope (FOG) transceiver subassembly as is known in the prior art. The diagram shows a fiber-coupled broadband source, e.g. a super luminescent diode (SLD) 101 for producing a non-coherent beam of light, and a directional coupler 102 in the path of the beam. A lithium niobate (LiNbO$_3$) phase modulator or FOG chip 105 is provided in a first path 104 from the output of the directional coupler, and a power monitoring photodiode 103 is provided in a second path 110 from the output of the directional coupler. A fiber loop or coil 108 with a fiber having a first 106 and second 107 end is coupled to the output of the phase modulator 105.

Light from the SLD 101 is split in the Y-junction of the phase modulator 105 and each path through the phase modulator is modulated before being applied to the first 106 and second 107 ends of the fiber loop 108 and counter-propagated through the coil. The optical signals then pass back through the phase modulator 105, are recombined in the Y-junction in the phase modulator and propagate back along path 104 to the directional coupler 102, whereby the return optical beam is then focused onto a receiving photodiode 109 where the intensity produces an electrical signal. The electrical signal is processed externally of the transceiver subassembly to compute the rotation rate of the coil 108 to provide inertial guidancy information.

Rotation in the plane of the fiber coil induces a change in the phase relationship of the two counter propagating beams, known as the Sagnac effect. The phase change may be measured as an intensity fluctuation on the receiving photodiode and further processing of the electrical signal may be used directly to determine the rotational rate of the coil. Since there is only one fiber loop and one plane, such measurement is a one-axis inertial measurement.

Figure 2:
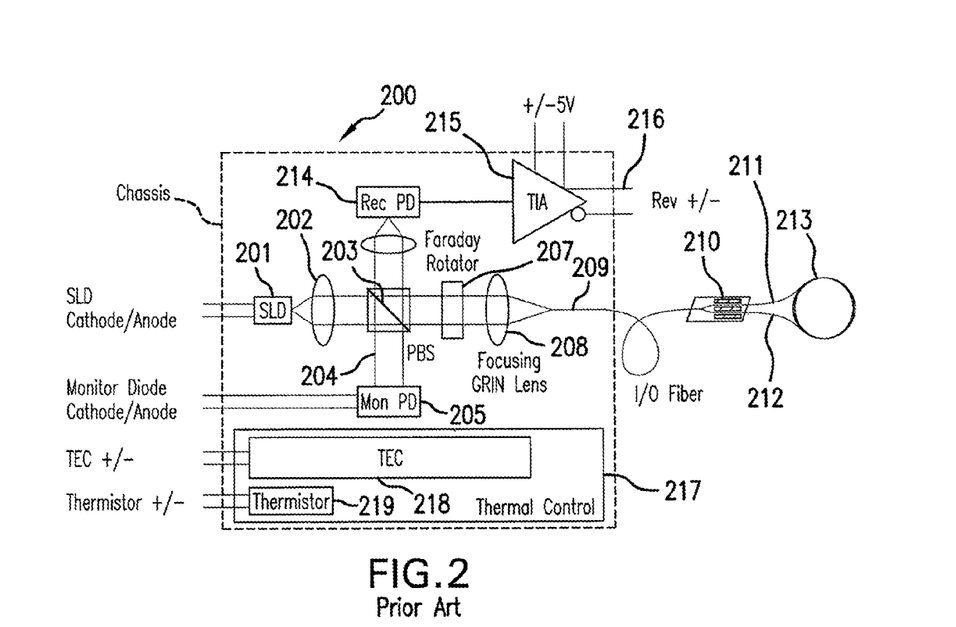
FIG. 2 is a detailed block diagram of a transceiver subassembly in a prior art single-axis fiber optic gyroscope.

FIG. 2 depicts a more detailed block diagram of a prior art single-axis FOG transceiver subassembly 200. In an effort to decrease cost, size, and parts count, the SLD 201, a collimating lens 202, an optical circulator (implemented with a polarizing beam-splitter, or PBS 203, and a Faraday rotator 207), a power monitoring photodiode 205, a receiver photodiode 214, and a trans-impedance amplifier (TIA) 215 are integrated into an extremely small housing or form factor package 200. One optical output beam of the PBS 203 is coupled through a Faraday rotator 207, which is in turn coupled to a focusing GRIN lens 208 which couples the beam emanating from the Faraday rotator 207 to the I/O optical fiber 209 extending from the housing 200. Another optical output beam 204 of the PBS 203 is coupled to a monitor photodiode 205. Outputs 216 of the trans-impedance amplifier (TIA) 215 are coupled the external processing circuitry.

The subassembly 200 further includes a thermal control unit 217 including a thermal electric cooler (TEC) 218 and a thermistor 219. The TEC 218 extends over the length of the unit incorporating the SLD 201, collimating lens 202, PBS 203, and Faraday rotator 207, and GRIN lens 208 so as to maintain a uniform temperature over all subcomponents.

One such embodiment of such a single-axis FOG transceiver subassembly 200 is a commercial product known as the FOG PB3010 transceiver module manufactured by Emcore Corporation in Alhambra, Calif.

Figure 3:
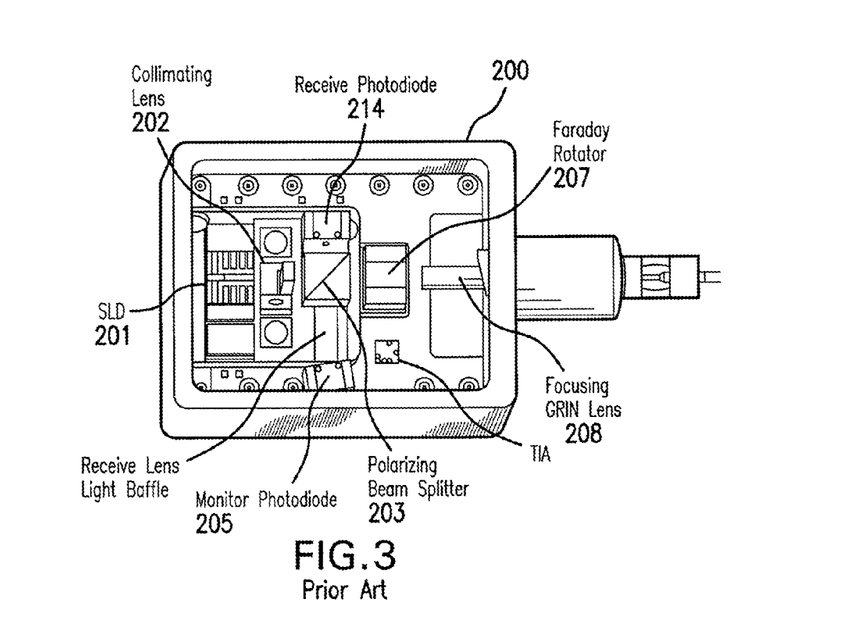
FIG. 3 is a top plan view of the transceiver subassembly in a prior art single-axis fiber optic gyroscope.

FIG. 3 is a top plan view of the prior art FOG shown in FIG. 2 with the lid of the housing removed to show the internal components. The Figure depicts the SLD 201, and a collimating lens 202 adjacent thereto. A polarizing beam-splitter or PBS 203 is disposed in the path of the beam from lens 202, and the transmitter monitor photodiode 205 located on one side of the PBS 203, and the receiver photodiode 214 located on a printed circuit board on the other side of the PBS 203. A trans-impedance amplifier (TIA) is also mounted on the printed circuit board, and is coupled to the photodiode 214 to produce the output electrical signal. The optical output beam of the PBS 203 is coupled through a Faraday rotator 207, which is in turn coupled to a focusing GRIN lens 208 which couples the beam emanating from the Faraday rotator 207 to the I/O optical fiber extending from the housing 200.

In the device illustrated in FIGS. 2 and 3, 96% of the optical output from the SLD 201 is in the out-of-plane polarization (S polarization) while the remaining 4% is in the in-plane polarization (P polarization). The polarizing beam splitter 203 reflects the P polarization from the SLD 201 onto the power monitoring photodiode 205 but passes the S polarization. The light then passes through the Faraday rotator 207 unaltered and is coupled at 211 into the fiber 213 with a lens 208. From this point the S polarized light travels through the rest of the fiber loop 213 until it returns at the second end 212 in the same polarization state as when it left. When the light passes through the Faraday rotator 207 in this direction (i.e. back towards the SLD 201) the polarization is rotated into the P state. The polarizing beam splitter 203 then reflects the optical return signal onto the receiving photodiode 214 that produces an electrical output directly connected to an internal TIA 215 and provides a typical gain of 10,000.

Figure 4:
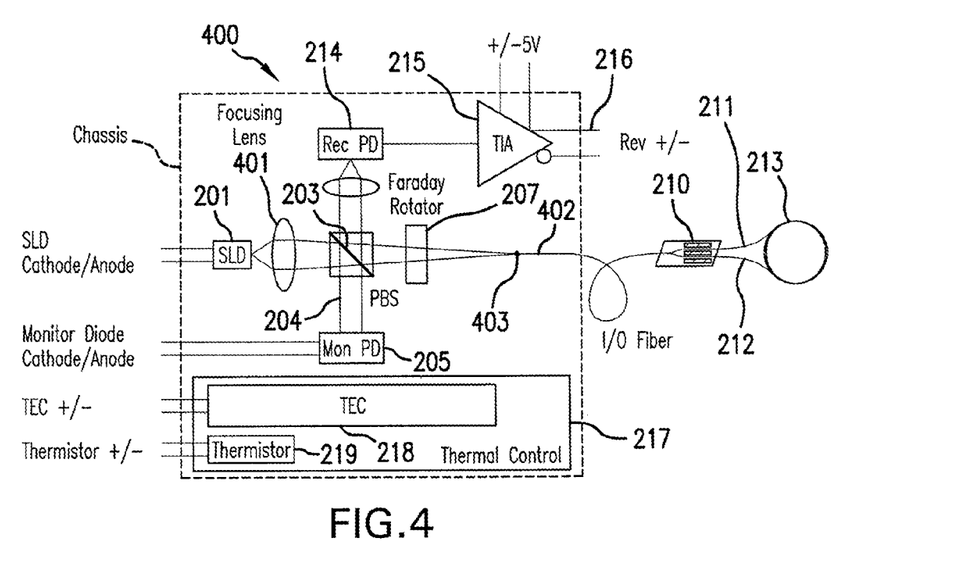
FIG. 4 is a detailed block diagram of the transceiver subassembly in a single-axis fiber optic gyroscope according to the present disclosure.

FIG. 4 is a highly simplified diagram of a single-axis FOG transceiver subassembly 400 with a single focusing lens 401 for focusing the light from the SLD 201 onto the optical circulator (implemented with a polarizing beam-splitter, or PBS, and a Faraday rotator 207), according to an embodiment of the present disclosure. The focusing lens 401 is positioned in the optical path between the SLD 201 and the optical circulator instead of using a collimating lens, and focuses the light beam over the optical path from the SLD 201 through the optical circulator including the Faraday rotator 207 to an optical focus point at the end 403 of the polarization-maintaining input/output optical fiber 402 for optically coupling the light beam to exterior of the FOG assembly 400. This way, the focusing GRIN lens conventionally placed in the light path between the Faraday rotator 207 and the internal fiber 402 (e.g. the focusing GRIN lens 208 in FIG. 2) and the collimating lens conventionally placed in the optical path between the SLD 201 and the optical circulator (e.g. lens 202 in FIG. 2) need not be utilized in the subassembly. Eliminating the additional lens may permit easier alignment and be able to permit a smaller form factor package. The input/output optical fiber 402 typically terminates in a "pig-tail" exterior of the FOG transceiver subassembly 400, whereby in some embodiments it may be spliced to the modulator 210 or other optical components.

The subassembly 400 further includes a thermal control unit 217 including a thermal electric cooler (TEC) 218 and a thermistor 219. The TEC 218 extends over the length of the unit incorporating the SLD 201, focusing lens 401, PBS 203, and Faraday rotator 207 so as to maintain a uniform temperature over all subcomponents.

Figure 5:
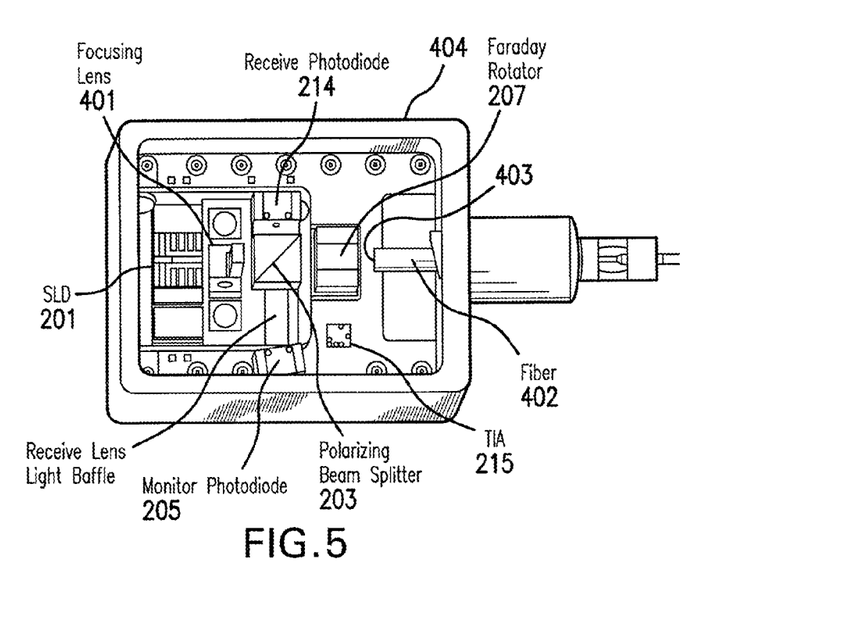
FIG. 5 is a top plan view of the transceiver subassembly of FIG. 4.

FIG. 5 is a top plan view of the FOG assembly 400 shown in FIG. 4 with the lid of the housing 404 removed to show the internal components. The focusing lens 401 is positioned between the SLD 201 and the optical circulator as described above. The PBS 203 component of the optical circulator is disposed in the path of the light beam from the focusing lens 401, and the transmitter monitor photodiode 205 located on one side of the PBS 203, and the receiver photodiode 214 located on a printed circuit board on the other side of the PBS 203. A trans-impedance amplifier (TIA) 215 is mounted on the printed circuit board and coupled to the photodiode 214 for producing the output electrical signal. The optical output beam from the PBS 203 is coupled through a Faraday rotator 207, which is in turn directly coupled to internal fiber 402 which couples to the external I/O optical fiber 402 extending from the housing 404.

Figure 6:
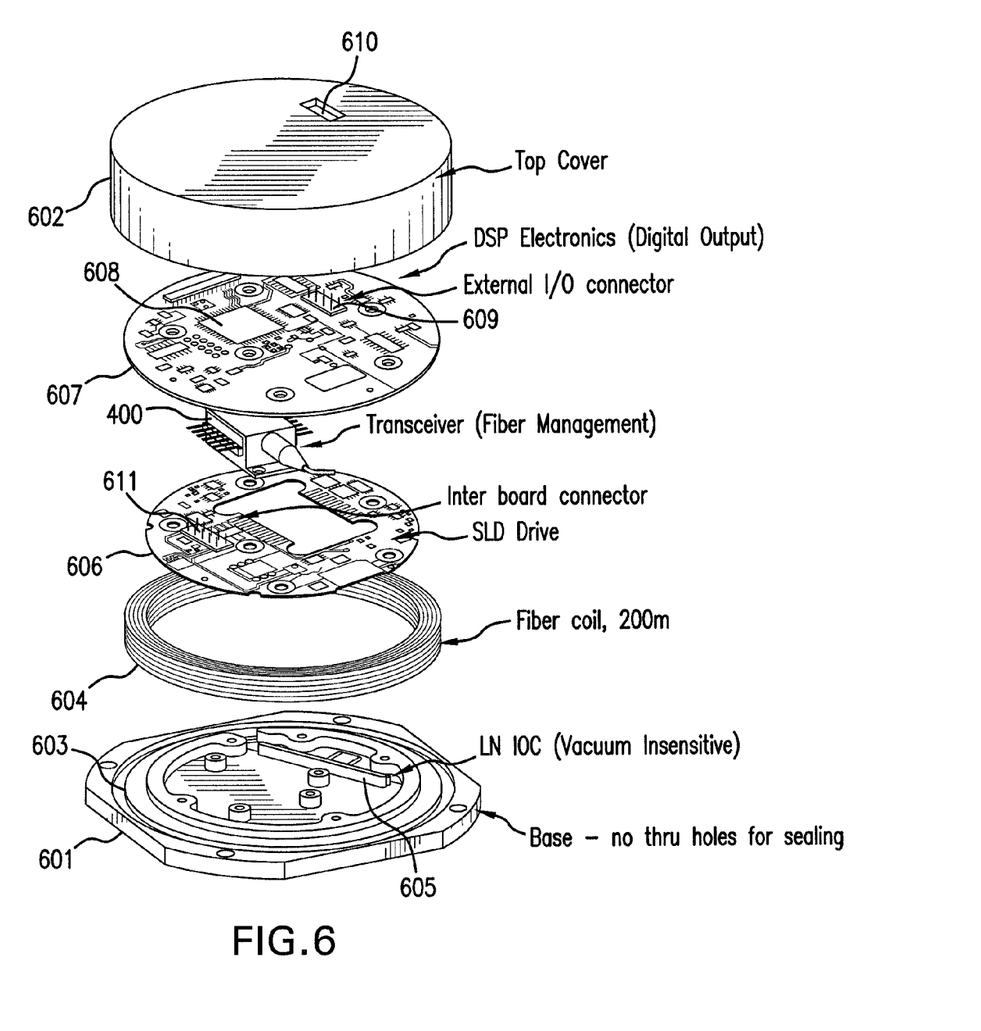
FIG. 6 is an exploded perspective view of an embodiment of a compact single-axis fiber optic gyroscope according to the present disclosure.

FIG. 6 is an exploded perspective view of an embodiment of a single-axis fiber optic gyroscope according to the present disclosure. The unit includes a metallic housing formed from a base plate 601 and a top cover 602. In one embodiment, the housing may be cylindrically shaped having dimensions of 80 mm in diameter and 20 mm in height. In one embodiment, the weight of the entire gyroscope is 160 grams. The housing may be composed of a suitable magnetically shielding material.

The base plate 601 includes an annular cavity 603 around the periphery thereof for securing a portion of the fiber coil 604. In one embodiment, the fiber coil 604 may be 200 meters in length, in which case the gyroscope may be considered a low accuracy model. In another embodiment, the fiber coil 604 may be 500 to 1000 meters in length, in which case the gyroscope may be considered a medium accuracy model. In another embodiment, the fiber coil 604 may be over 2 kilometers in length, in which case the gyroscope may be considered a high accuracy model.

The base plate 601 further includes a support or mount 605 for mounting the phase modulator 210. Above the base plate 601 is a first printed circuit board 606 on which the transceiver and other electronic components may be mounted. Above the first printed circuit board 606 is a second printed circuit board 607 which includes the processor 608 and other digital components, and an external input/output connector 609 which extends through an opening 610 in the top cover 602. The first printed circuit board 606 and the second printed circuit board 607 may be connected by an inter-board electrical connector 611. In one embodiment the processor may be a digital signal processor having a sufficiently high clock rate or processing speed to allow rate changes in the angular orientation of the fiber coil 213 of greater than 2000 degrees, and up to 3000 degrees per second, or more, to be processed and reported.

Depending upon the length of the fiber coil the housing may be suitably sized in both diameter and height, and appropriate programming of the software associated with the processor to account for the fiber coil length, the fiber optic gyroscope as described above may be specified to have the following performance parameters:

TABLE

| Coil length | Rotational Rate Drift | Noise |
|---|---|---|
| 200 meters | 0.5 degrees/hour | 0.0200 degrees/square root-hour |
| 1200 meters | 0.01 degrees/hour | 0.0017 degrees/square root-hour |

Thus, one embodiment of a fiber optic gyroscope as described above has a rotational rate drift of less than 0.01 degrees per hour, and noise, measured in angular degrees random walk per square root of an hour, of less than 0.0017 degrees per square-root-hour.

In some embodiments, the rotational rate has a drift of between 0.005 and 1.0 degrees per hour.

In some embodiments, the noise measured in angular degrees random walk per square root of hour is between 0.001 and 0.02 degrees.

In some embodiments, the length of the fiber coil is between 100 m and 2 km.

In some embodiments, the drift of the rotational rate, the noise measured in angular degrees random walk per square root of hour, and the length of the fiber coil, may be adjusted or selected by the user to achieve a desired performance or operational capability.

The present disclosure contemplates that the fiber coil length selected, and the software appropriately programmed for the fiber coil length, so the fiber optic gyroscope as described above may be operationally specified to meet the customer's or application's desired performance parameters substantially within the ranges suggested above using currently available components.

While the present disclosure illustrates and describes a fiber optic gyroscope, it is not intended to be limited to the details shown, since various modifications and structural changes may be made without departing in any way from the spirit of the present disclosure.

It will be understood that each of the elements described above, or two or more together, also may find a useful application in other types of constructions differing from the types described above. In particular, certain configurations presented according to particular aspects of the present invention have been shown and described as discrete elements, i.e., lasers, splitters, combiners, mirrors, lenses, shifters, fiber optical cable, etc. Those skilled in the art will readily appreciate that many or all of these individual, discrete components may be fabricated and/or packaged into integrated elements. By way of particular example, the use of integrated waveguides and associated structures is envisioned for the described structures and arrangements. Alternatively, the discrete elements, i.e., lasers, splitters, combiners, mirrors, lenses, shifters, etc. may also be individually-packaged in modules with optical fiber interconnects to achieve the same topology and functionality.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The foregoing described embodiments depict different components contained within, or connected with, different other components. It is to be understood that such depicted arrangements or architectures are merely exemplary, and that in fact many other arrangements or architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of specific structures, architectures or intermedial components. Likewise, any two components so associated can also be viewed as being "operably connected" or "operably coupled" to each other to achieve the desired functionality.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting.

Without further analysis, from the foregoing others can, by applying current knowledge, readily adapt the disclosed technology for various applications. Such adaptations should and are intended to be comprehended within the meaning and range of equivalence of the following claims.

What is claimed is:

1. A compact fiber optic gyroscope comprising:
    a first housing defining an interior and comprising:
        a base plate portion defining an annular cavity, and
        a top cover portion configured to be coupled to the base plate portion to define the interior of the first housing, wherein the top cover portion defines an input/output opening;
    a planar optical fiber loop having a first end and a second end and at least partially secured by the annular cavity of the base plate portion, wherein the planar optical fiber loop is disposed in the first housing around the periphery of the interior of the first housing and defines an inner circumference;
    a transceiver module disposed in the interior of the first housing within the inner circumference of the planar optical fiber loop, wherein the transceiver module comprises:
        a second housing;
        a non-coherent light source disposed in the second housing for producing a first beam of light;
        an optical circulator disposed in the second housing and in the path of the first beam of light to produce polarized second and third beams, with polarization orthogonal to each other;
        a focusing lens disposed in the second housing and positioned in an optical path between the non-coherent light source and the optical circulator to focus non-coherent light from the non-coherent light source to a focus point beyond the optical circulator; and
        first and second photodiodes disposed in the second housing and coupled to the optical circulator, wherein the first photodiode is a transmit monitor photodiode coupled to the second beam, and the second photodiode is a receiver photodiode;
    a phase modulator mounted on the base plate portion and disposed in the interior of the first housing within the inner circumference of the planar optical fiber loop and coupled to the third beam from the transceiver module to produce fourth and fifth beams coupled to the first and the second ends, respectively, of the optical fiber loop, and receiving return sixth and seventh beams from the second and the first ends, respectively, of the fiber loop, and coupling the return sixth and seventh beams to the receiver photodiode in the transceiver module;
    a processor disposed in the interior of the first housing within the inner circumference of the planar optical fiber loop and coupled to the receiver photodiode for determining a phase relationship between the return sixth and seventh beams and thereby determining the rotational rate of the planar optical fiber loop with respect to an axis; and
    an input/output connector operatively coupled to the processor and configured to at least report inertial guidance information, wherein the external input/output connector extends through the input/output opening of the top cover portion.

2. A compact fiber optic gyroscope as defined in claim 1, wherein the first housing is cylindrically shaped having dimensions of approximately 80 mm in diameter and 20 mm in height.

3. A compact fiber optic gyroscope as defined in claim 1, wherein the weight of the gyroscope is 160 grams or less.

4. A compact fiber optic gyroscope as defined in claim 1, wherein the second housing is a hermetically sealed butterfly package.

5. A compact fiber optic gyroscope as defined in claim 1, wherein the transceiver module includes a single input/output optical fiber coupled to the optical circulator.

6. A compact fiber optic gyroscope as defined in claim 5, wherein the single input/output optical fiber terminates in a pig tail.

7. A compact fiber optic gyroscope as defined in claim 1, wherein the first housing is cylindrically shaped.

8. A compact fiber optical gyroscope as defined in claim 1, wherein the phase modulator is a lithium niobate modulator.

9. A compact fiber optic gyroscope as defined in claim 1, wherein the phase modulator has an output pair of optical fibers, one of which is spliced to the first end of the planar optical fiber loop and the other of which is spliced to the second end of the planar optical fiber loop.

10. A compact fiber optic gyroscope as defined in claim 1, wherein said optical circulator includes a polarizing beam splitter.

11. A compact fiber optic gyroscope as defined in claim 10, wherein said optical circulator further comprises a Faraday rotator coupled to an output of the polarizing beam splitter.

12. A compact fiber optic gyroscope as defined in claim 10, wherein the polarizing beam splitter directs the P polarization of the first beam of light from the light source onto the transmit monitor photodiode.

13. A compact fiber optic gyroscope as defined in claim 11, wherein the polarizing beam splitter directs the S polarization of the first beam of light from the light source through and into the Faraday rotator.

14. A compact fiber optic gyroscope as defined in claim 11, wherein the Faraday rotator changes the polarization of the S polarized return sixth and seventh beams to a P polarized eighth beam, and the polarizing beam splitter then directs the P polarized eighth beam to the receiver photodiode.

15. A compact fiber optic gyroscope as defined in claim 1, wherein the rotational rate has a drift of between 0.005 and 1.0 degrees per hour.

16. A compact fiber optic gyroscope as defined in claim 1, wherein the noise measured in angular degrees random walk per square root of hour is between 0.001 and 0.02 degrees.

17. A compact fiber optic gyroscope as defined in claim 1, wherein the length of the fiber optic loop is between 100 m and 2 km.

18. A compact fiber optic gyroscope as defined in claim 1, wherein the processor is software programmable to take into account the length of the optical fiber loop.

19. A compact fiber optic gyroscope as defined in claim 1, further comprising:
    a first printed circuit board coupled to the base plate portion;
    a second printed circuit board, wherein the processor and the input/output connector is coupled to the second printed circuit board; and an inter-board electrical board connecting the first printed circuit board to the second printed circuit board.

* * * * *